(No Model.)
G. S. WEBB.
TIRE FOR WHEELS OF VEHICLES.
No. 519,748. Patented May 15, 1894.
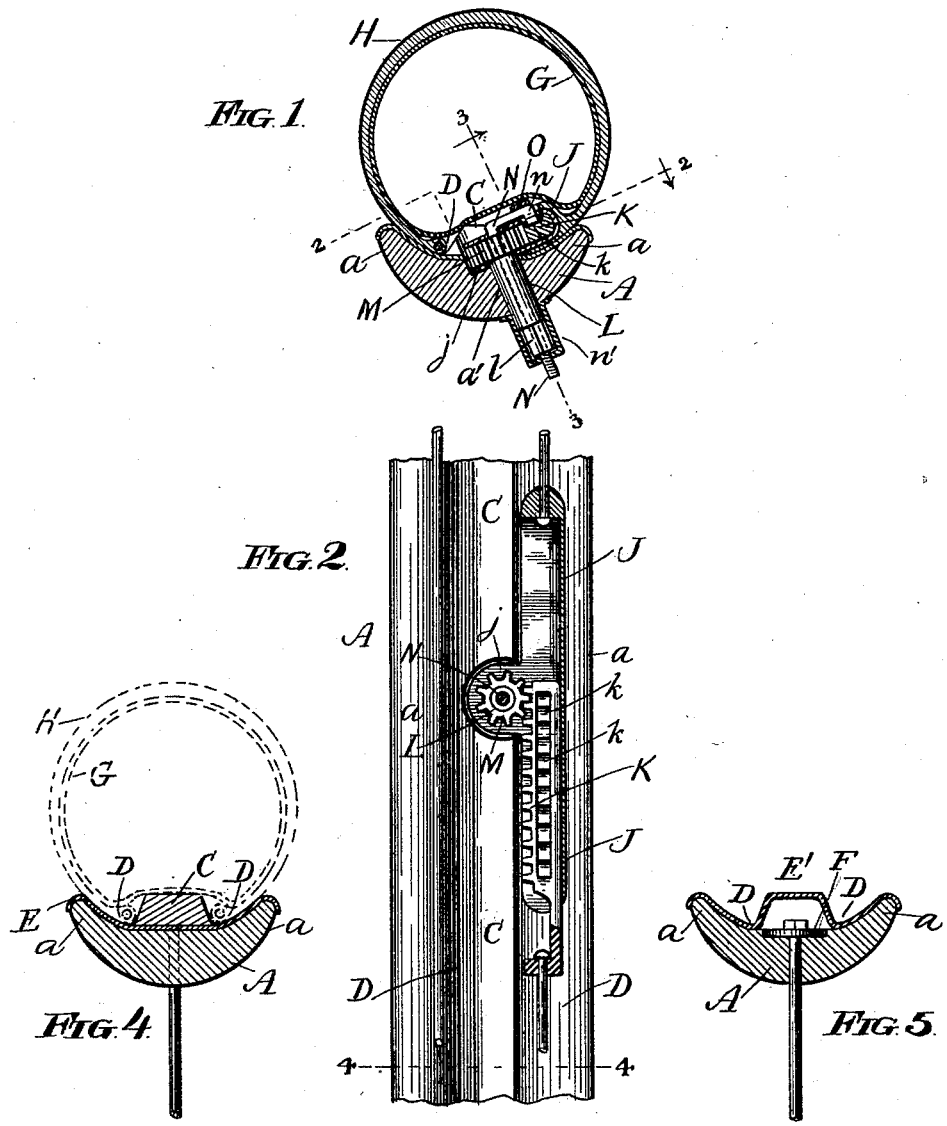
Witnesses:
J. Halpenny
A. H. Cooper
Inventor:
George S. Webb
By his Attorneys,
Greeley & Hopkins

UNITED STATES PATENT OFFICE.

GEORGE S. WEBB, OF AURORA, ILLINOIS.

TIRE FOR WHEELS OF VEHICLES.

SPECIFICATION forming part of Letters Patent No. 519,748, dated May 15, 1894.

Application filed December 16, 1893. Serial No. 493,883. (No model.)

*To all whom it may concern:*

Be it known that I, GEORGE S. WEBB, a citizen of the United States, residing at Aurora, in the county of Kane and State of Illinois, have invented certain new and useful Improvements in Wheels for Vehicles, of which the following is a specification, reference being had to the accompanying drawings, which are made a part hereof, and in which—

Figures 1, 2, 3, and 4 are sections of portions of a wheel embodying the invention, the cutting planes being indicated by the lines 1—1, 2—2, 3—3, and 4—4, respectively. Fig. 5 is a transverse section of a rim differing somewhat from that shown in the preceding figures.

In the drawings I have not shown the entire wheel, but I have shown enough thereof to enable those skilled in the art to make and use my invention, which relates in part to the rim and in part to the means for securing the tire in place thereon.

The invention consists in the features of novelty that are particularly pointed out in the claims hereinafter.

The rim is shown under two modifications, in each of which there is a base or felly A having a wide peripheral groove (which results in two marginal lips of flanges $a$), a metallic facing which covers the periphery of the felly, extending from side to side thereof and embracing the flanges, and a rib C located centrally between the flanges $a$, the several parts being so assembled and secured together as to form a rim having two parallel peripheral grooves D. In the form shown in Figs. 1 to 4, the metallic facing E conforms to the shape of the outer periphery of the felly, and the rib C is formed of a strip (preferably of wood) secured against the facing, preferably by screws driven into the felly. In the form shown in Fig. 5 the rib is integral with the facing (shown at E′) both being formed of sheet-metal bent to the required cross-sectional shape. In both forms the felly is preferably of wood. In the form shown in Figs. 1 to 4 the facing is preferably of sheet-steel, and in the form shown in Fig. 5 it is preferably of aluminum. Where the rib is hollow, as in this latter figure, a steel plate F is placed beneath it and against the felly, for affording a suitable bearing for the heads of the spokes.

Heretofore the outer coverings of pneumatic tires have been secured in place by wires or bands which engage the margins of the coverings, encircle the rim of the wheel, and have their ends united by mechanism by which they may be drawn sufficiently taut to prevent their leaving the grooves of the rim. The object of the present invention is to provide improved mechanism for uniting the ends of the wires or bands and drawing and holding them taut. According to the present invention this mechanism is not secured to the rim, but the rim is simply provided with a suitable seat for it, and the mechanism is held in place upon the rim simply by the tension of the band which it secures together so that when the band is slackened the said mechanism may be lifted, with the edge of the covering, from the rim. Where two bands are used, each is entirely separate from and independent of the other, and the mechanism for connecting the ends of one is entirely separate from and independent of the mechanism for connecting the ends of the other, so that one band may be slackened and one edge of the covering lifted without disturbing the other band and edge of the covering.

In the drawings G represents the inner elastic tube, H the outer covering, having along each of its edges or margins a longitudinal duct or perforation, and I the binding wires or bands, one occupying each of said ducts or perforations. In the drawings I have shown the connecting mechanism for only one of these bands, but it will be understood that they are or may be similarly connected.

J is a sheet-metal housing, which is closed at one end save for a perforation through which the wire band passes, the extremity of the band being headed to prevent its being drawn out. The other end of the band is passed through a similar perforation in the extremity of a toothed rack K, and its extremity also is headed to prevent its being drawn out. The housing is of U-shape in cross-section, and is of such depth that it prevents the teeth from coming in contact with the covering. At an intermediate point the housing is provided with a pair of perforated ears or lugs *j*, in which is journaled a shaft L, and between which is located a pinion M secured to said shaft and engaging the rack. The shaft has a longitudinal perforation which is occupied by a rod or stem N, of sufficient length to project from both ends of the shaft. One end of this stem is bent to form a tooth or pawl *n*, which is adapted to engage any one of a series of ratchet teeth *k* formed in the side of the rack K. One face of each of these teeth is perpendicular to the length of the rack bar and the other face inclined, so that as the rack bar is moved inward, or in the direction that brings the extremities of the wire closer together, the inclined face of the teeth will engage the pawl *n* and force it outward far enough to let the teeth pass it, said pawl being caused to engage the several teeth, as they successively pass it, by a suitably arranged spring. For this purpose a plate spring O may be secured to the housing in such position that it engages the pawl as shown. The outer end of the shaft is squared, as shown at *l*, for the reception of a key whereby the pinion may be turned for drawing the two ends of the wire together, and the projecting outer end of the stem N is threaded for the reception of a cap *n'* which serves three purposes; namely, a covering for the squared end of the shaft, a lock nut for preventing the stem from being accidentally forced in, and a head or button to facilitate forcing the stem in when it is desired to disengage the pawl from the ratchet. When it is to perform the first two offices, the cap is screwed onto the stem until it bears firmly against the rim of the wheel, and when it is to perform the third office it is turned off a sufficient distance to permit the necessary endwise movement of the stem. This completes the description of the connecting mechanism. It is not attached to the rim of the wheel in any way, excepting that the rim is provided with a perforation *a'* for receiving the shaft L, and the rib C is cut away to receive that portion of the housing which incloses the pinion. By locating the bore *a'* with its axis inclined to the plane of the wheel the housing is brought into such position that it lies snugly in one of the grooves D, and in addition to this the extremity of the shaft is removed from the plane of the spokes so that it may be conveniently reached and turned.

It will be understood that the duct or perforation in the margin of the covering is of sufficient size to receive all of the housing excepting the ears *j*, and to accommodate these it is cut away.

Having thus described my invention, what I claim as new, and desire to secure by Letters Patent, is—

1. In a wheel, the combination with the rim and tire, of a band engaging the tire and binding it to the rim, said band having mechanism connecting its ends and adapted to draw and hold it taut, said mechanism being removably seated upon the rim so that it can be lifted therefrom with the tire when the band is slack, said mechanism including a rack and pinion, means for turning the pinion, and a detent for holding the parts to their adjustment, substantially as set forth.

2. In a wheel, the combination with the rim and tire, of a band engaging the tire and binding it to the rim, said band having mechanism connecting its ends and adapted to draw and hold it taut, said mechanism being removably seated upon the rim so that it can be lifted therefrom with the tire when the band is slack, said mechanism including a rack and pinion, means for turning the pinion, a pawl and ratchet, and means for causing said pawl to automatically engage the ratchet for holding the mechanism to its adjustment, substantially as set forth.

3. In a wheel, the combination with the rim and tire, of a band engaging the tire and binding it to the rim, said band having mechanism connecting its ends and adapted to draw and hold it taut, said mechanisms being removably seated upon the rim so that it can be lifted therefrom with the tire when the band is slack, said mechanism including a housing to which one end of the band is attached, a rack bar mounted to slide in the housing and to which the other end of the band is attached, a pinion journaled in the housing and engaging the rack bar, means for turning the pinion, and a detent for holding the parts to their adjustment, substantially as set forth.

4. In a wheel, the combination with the rim and tire, of a band engaging the tire and binding it to the rim, said band having mechanism connecting its ends and adapted to draw and hold it taut, said mechanism being removably seated upon the rim so that it can be lifted therefrom with the tire when the band is slack, said mechanism including a housing to which one end of the band is attached, a rack bar mounted to slide in the housing and to which the other end of the band is attached, a pinion journaled in the housing and engaging the rack bar, means for turning the pinion, a pawl engaging one of the operative parts, and a spring holding said pawl normally in engagement, substantially as set forth.

5. In a wheel, the combination with the rim and tire, of a band engaging the tire, a housing to which one end of the band is attached, a rack bar to which the other end of the band is attached, a series of ratchet teeth formed on the said rack bar, a pinion journaled in the housing and engaging said rack bar, means for turning the pinion, a pawl, means for causing said pawl to automatically engage said ratchet teeth, and a stem for moving said pawl and disengaging it from said ratchet teeth, substantially as set forth.

6. In a wheel, the combination with the rim and tire, of a band engaging the tire and holding it to the rim, said band having mechanism connecting its ends and adapted to draw and hold it taut, said mechanism including a sliding bar having a series of ratchet teeth, a pawl, and a spring engaging said pawl and holding it normally in engagement with said teeth, substantially as set forth.

7. In a wheel, the combination with the rim and tire, of a band engaging the tire, mechanism for connecting the ends of the band and drawing and holding it taut, said mechanism including a rack and pinion, and a shaft to which the pinion is secured, said shaft having a longitudinal perforation, a detent for preventing retrograde movement of the rack bar, means for causing said detent to engage automatically, and a stem for lifting the detent, said stem occupying the perforation of the shaft, substantially as set forth.

8. In a wheel, the combination with the rim and tire, of a band engaging the tire, mechanism for connecting the ends of the band and drawing and holding it taut, said mechanism including a rack and pinion, a longitudinally perforated shaft to which the pinion is secured, a detent for preventing retrograde movement of the rack, a stem for lifting said detent occupying the perforation of the shaft, and a cap screwed onto the projecting end of the stem and serving as a lock for preventing the accidental inthrust of the stem, and serving also to facilitate its inthrust when the detent is to be raised, substantially as set forth.

GEORGE S. WEBB.

Witnesses:
L. M. HOPKINS,
J. HALPENNY.